United States Patent
Saito et al.

(10) Patent No.: US 10,858,287 B2
(45) Date of Patent: Dec. 8, 2020

(54) THICKENERS AND HYDRAULIC COMPOSITIONS

(71) Applicant: Shin-Etsu Chemical Co., Ltd., Tokyo (JP)

(72) Inventors: Hironao Saito, Joetsu (JP); Hidekazu Konishi, Joetsu (JP); Tsutomu Yamakawa, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 16/164,363

(22) Filed: Oct. 18, 2018

(65) Prior Publication Data

US 2019/0127276 A1    May 2, 2019

(30) Foreign Application Priority Data

Oct. 31, 2017  (JP) ................. 2017-209948

(51) Int. Cl.

| C04B 24/26 | (2006.01) |
|---|---|
| C04B 28/02 | (2006.01) |
| C04B 40/00 | (2006.01) |
| C04B 24/38 | (2006.01) |
| C04B 103/44 | (2006.01) |
| C04B 111/00 | (2006.01) |
| C04B 103/00 | (2006.01) |
| C04B 111/72 | (2006.01) |
| C04B 111/62 | (2006.01) |
| C04B 103/50 | (2006.01) |

(52) U.S. Cl.
CPC ........ C04B 24/2652 (2013.01); C04B 24/383 (2013.01); C04B 28/02 (2013.01); C04B 40/0042 (2013.01); C04B 2103/0079 (2013.01); C04B 2103/44 (2013.01); C04B 2103/50 (2013.01); C04B 2111/00637 (2013.01); C04B 2111/62 (2013.01); C04B 2111/72 (2013.01)

(58) Field of Classification Search
CPC ... C04B 24/2652; C04B 24/383; C04B 28/02; C04B 40/0042
See application file for complete search history.

(56) References Cited

U.S. PATENT DOCUMENTS

| 2012/0315489 A1* | 12/2012 | Hohn | C04B 24/383 428/423.5 |
|---|---|---|---|
| 2014/0287148 A1* | 9/2014 | Kiesewetter | C04B 24/383 427/384 |
| 2015/0101810 A1* | 4/2015 | Aines | C04B 28/02 166/292 |
| 2016/0009599 A1* | 1/2016 | Yamakawa | C04B 40/0042 524/5 |

FOREIGN PATENT DOCUMENTS

| JP | 3-13183 B2 | 2/1991 |
|---|---|---|
| JP | 6-192650 A | 7/1994 |

* cited by examiner

*Primary Examiner* — John E Uselding
(74) *Attorney, Agent, or Firm* — Birch, Stewart, Kolasch & Birch, LLP

(57) ABSTRACT

A thickener is provided comprising an anionic polyacrylamide group containing at least two anionic polyacrylamides having different degrees of anionization, and a water-soluble cellulose ether. When added to a hydraulic composition, the thickener is effective for improving flow while maintaining rheological properties.

18 Claims, No Drawings

THICKENERS AND HYDRAULIC COMPOSITIONS

CROSS-REFERENCE TO RELATED APPLICATION

This non-provisional application claims priority under 35 U.S.C. § 119(a) on Patent Application No. 2017-209948 filed in Japan on Oct. 31, 2017, the entire contents of which are hereby incorporated by reference.

TECHNICAL FIELD

This invention relates to hydraulic compositions and thickeners therefor.

BACKGROUND ART

Polyacrylamides are widely used in the field of building materials. For example, Patent Document 1 discloses a water permeable composition comprising an aggregate (e.g., sand, dirt, gravel or mixture thereof), a thickener consisting of a water-soluble cellulose ether and a water-soluble polyacrylamide, and water, the composition being amenable to pump feed.

Patent Document 2 discloses a sag-controlled cement mortar composition comprising 100 parts by weight of cement, 0.02 to 3 parts by weight of water-soluble nonionic cellulose ether, and 0.001 to 0.2 part by weight of partially anionized polyacrylamide.

CITATION LIST

Patent Document 1: JP-A H06-192650
Patent Document 2: JP-B H03-013183

Disclosure of Invention

However, since the anionic polyacrylamides used in Patent Documents 1 and 2 have an agglomeration ability, they, when added to a cement composition, cause cement particles to agglomerate together. As a result, the composition becomes less flowing and difficult to apply. There is left room for improvement.

An object of the invention is to provide a thickener which when added to a hydraulic composition, is effective for improving the flow of the composition while maintaining rheological properties; and a hydraulic composition comprising the same.

The inventors have found that when at least two anionic polyacrylamides having different degrees of anionization are added to a hydraulic composition, the flow thereof is improved while maintaining rheological properties.

In one aspect, the invention provides a thickener for hydraulic compositions comprising an anionic polyacrylamide group containing at least two anionic polyacrylamides having different degrees of anionization, and a water-soluble cellulose ether.

In the anionic polyacrylamide group containing at least two anionic polyacrylamides having different degrees of anionization, a difference in degree of anionization between anionic polyacrylamides is preferably at least 3 mol %, and a weighted average value of the degrees of anionization is preferably from more than 2.0 mol % to 33.2 mol %.

Preferably, the anionic polyacrylamide group has an alkali metal or alkaline earth metal cation as the counter cation.

Preferably, the anionic polyacrylamide group consists of a first anionic polyacrylamide having a degree of anionization of 1 mol % to 6 mol % and a second anionic polyacrylamide having a degree of anionization of more than 6 mol % to 40 mol %.

Preferably, the water-soluble cellulose ether has a 1 wt % aqueous solution viscosity of 30 to 30,000 mPa·s at 20° C. The water-soluble cellulose ether is preferably at least one member selected from the group consisting of alkyl celluloses, hydroxyalkyl celluloses and hydroxyalkyl alkyl celluloses.

The thickener may further comprise a defoamer.

In another aspect, the invention provides a hydraulic composition comprising the thickener defined above, a hydraulic substance, and water.

Advantageous Effects of Invention

The inventive thickener, when added to a hydraulic composition, is effective for improving the flow of the composition while maintaining rheological properties. The hydraulic composition is easier to apply.

DESCRIPTION OF PREFERRED EMBODIMENTS

One embodiment of the invention is a thickener for hydraulic compositions comprising an anionic polyacrylamide group containing at least two anionic polyacrylamides having different degrees of anionization, and a water-soluble cellulose ether.

The anionic polyacrylamide group contains at least two anionic polyacrylamides having different degrees of anionization, for example, a first anionic polyacrylamide having a first degree of anionization and a second anionic polyacrylamide having a second degree of anionization different from the first degree of anionization. If desired, three or more anionic polyacrylamides may be used in combination.

Suitable anionic polyacrylamides include polyacrylamides, copolymers of polyacrylamides with sodium acrylate, hydrolyzates thereof with sodium hydroxide, and sulfomethyl-modified compounds thereof. The anionic polyacrylamide includes compounds having different pendant chemical structures, typically polar functional groups (specifically functional groups originating from —$CONH_2$). The anionic polyacrylamides have a molecular weight of several million to ten-odd million.

The anionic polyacrylamide has a counter cation (i.e., cation in the pendant polar functional group), which is preferably an alkali metal cation or alkaline earth metal cation. Suitable alkali metal cations include lithium, sodium and potassium ions, with the sodium ion being preferred for economy. Suitable alkaline earth metal cations include magnesium and calcium ions.

The combination of first and second anionic polyacrylamides may be a combination of identical type or different types (that is, the pendant chemical structures of anionic polyacrylamides may be identical or different) as long as their degrees of anionization are different. Namely, the at least two anionic polyacrylamides encompass a combination of anionic polyacrylamides having different degrees of anionization and different pendant chemical structures, and a combination of anionic polyacrylamides having different degrees of anionization and an identical pendant chemical structure.

In the embodiment wherein the anionic polyacrylamide group consists of a first anionic polyacrylamide and a second anionic polyacrylamide, the first anionic polyacrylamide (PAM1) has a degree of anionization ($Ad_{PAM1}$) which is preferably from 1 mol % to 6 mol %, more preferably from 1 mol % to 5 mol %, from the standpoint of improving the flow of the hydraulic composition. The second anionic polyacrylamide (PAM2) has a degree of anionization ($Ad_{PAM2}$) which is preferably from more than 6 mol % to 40 mol %, more preferably from 8 mol % to 35 mol %, from the standpoint of improving the flow of the hydraulic composition.

The difference in degree of anionization between at least two anionic polyacrylamides in the anionic polyacrylamide group is preferably at least 3 mol %, more preferably at least 5 mol %, and even more preferably at least 10 mol %. For example, the difference ($Ad_{PAM2}-Ad_{PAM1}$) between the degree of anionization ($Ad_{PAM1}$) of first anionic polyacrylamide and the degree of anionization ($Ad_{PAM2}$) of second anionic polyacrylamide is preferably at least 3 mol %. By setting a difference in degree of anionization between to two anionic polyacrylamides, the hydraulic composition having the thickener added thereto is improved in flow. The difference ($Ad_{PAM2}-Ad_{PAM1}$) in degree of anionization is preferably up to 35 mol %, more preferably up to 30 mol %, for example, although the upper limit is not critical.

As used herein, the term "degree of anionization" (Ad) refers to a proportion (mol %) of anionic ones relative to amide groups (pendant —$CONH_2$ groups) of polyacrylamide, which is measurable by the colloid titration method.

A weight ratio ($Mr_{PAM1}:Mr_{PAM2}$) of the first anionic polyacrylamide (PAM1) to the second anionic polyacrylamide (PAM2) is preferably between 20:80 and 80:20, more preferably between 35:65 and 80:20, even more preferably between 35:65 and 45:55, from the standpoint of improving the flow of the hydraulic composition.

The anionic polyacrylamide group has a degree of anionization which is a weighted average value of the degrees of anionization of plural anionic polyacrylamides. Where the anionic polyacrylamide group consists of two anionic polyacrylamides having different degrees of anionization, the group's degree of anionization is computed according to the following equation:

$$Ad_{wa}=(Ad_{PAM1} \times Mr_{PAM1}+Ad_{PAM2} \times Mr_{PAM2})/100$$

wherein $Ad_{wa}$: weighted average value (mol %) of degree of anionization,
$Ad_{PAM1}$: degree of anionization (mol %) of first anionic polyacrylamide,
$Mr_{PAM1}$: weight ratio of first anionic polyacrylamide,
$Ad_{PAM2}$: degree of anionization (mol %) of second anionic polyacrylamide, and
$Mr_{PAM2}$: weight ratio of second anionic polyacrylamide.

For example, an anionic polyacrylamide group consisting of a first anionic polyacrylamide having a degree of anionization ($Ad_{PAM1}$) of 5 mol % and a second anionic polyacrylamide having a degree of anionization ($Ad_{PAM2}$) of 15 mol % in a weight ratio ($Mr_{PAM1}:Mr_{PAM2}$) of 25:75 has a weighted average value ($Ad_{wa}$) of anionization degree which is (5×25+15×75)/100=12.5 mol %.

The anionic polyacrylamide group used in the thickener should preferably have a weighted average value ($Ad_{wa}$) of anionization degree which is from more than 2.0 mol % to 33.2 mol %, more preferably from 5.0 mol % to 30.0 mol %, from the standpoint of improving the flow of the hydraulic composition.

In the thickener, the anionic polyacrylamide group is preferably present in an amount of 1.0 to 25.0% by weight, more preferably 1.0 to 10.0% by weight, even more preferably 1.0 to 5.0% by weight, from the standpoint of improving the flow of the hydraulic composition. The anionic polyacrylamides may take any form of granular powder, fine powder or aqueous solution.

The hydraulic composition includes a water-soluble cellulose ether which is nonionic. Suitable cellulose ethers include alkyl celluloses such as methyl cellulose, hydroxyalkyl celluloses such as hydroxyethyl cellulose and hydroxypropyl cellulose, and hydroxyalkyl alkyl celluloses such as hydroxypropyl methyl cellulose, hydroxyethyl methyl cellulose, and hydroxyethyl ethyl cellulose. The water-soluble cellulose ethers may be used singly or in combination.

Of the alkyl celluloses, methyl cellulose should preferably have a degree of methoxy substitution (DS) of 1.00 to 2.20, more preferably 1.20 to 2.00. Notably, the DS of alkyl in alkyl cellulose may be computed from a measurement by the analysis of DS of methyl cellulose prescribed in the Japanese Pharmacopoeia, 17th Edition.

Of the hydroxyalkyl celluloses, hydroxyethyl cellulose should preferably have a molar substitution (MS) of hydroxyethoxy of 0.30 to 3.00, more preferably 0.50 to 2.80; and hydroxypropyl cellulose should preferably have a molar substitution (MS) of hydroxypropyl of 0.30 to 3.30, more preferably 0.10 to 3.00. Notably, the MS of hydroxyalkyl in hydroxyalkyl cellulose may be computed from a measurement by the analysis of MS of hydroxypropyl cellulose prescribed in the Japanese Pharmacopoeia, 17th Edition.

Of the hydroxyalkyl alkyl celluloses, hydroxypropyl methyl cellulose should preferably have a DS of methoxy of 1.00 to 2.20, more preferably 1.30 to 1.90, and a MS of hydroxypropoxy of 0.10 to 0.60, more preferably 0.10 to 0.50. Hydroxyethyl methyl cellulose should preferably have a DS of methoxy of 1.00 to 2.20, more preferably 1.30 to 1.90, and a MS of hydroxyethoxy of 0.10 to 0.60, more preferably 0.20 to 0.40. Hydroxyethyl ethyl cellulose should preferably have a DS of methoxy of 1.00 to 2.20, more preferably 1.20 to 2.00, and a MS of hydroxyethyl of 0.05 to 0.60, more preferably 0.10 to 0.50. Notably, the DS of alkyl and the MS of hydroxyalkyl in hydroxyalkyl alkyl cellulose may be computed from a measurement by the analysis of DS of hypromellose (hydroxypropyl methyl cellulose) prescribed in the Japanese Pharmacopoeia, 17th Edition.

Notably, DS refers to "degree of substitution" corresponding to the number of alkoxy groups per glucose ring unit of cellulose; and MS to "molar substitution" corresponding to the average molar number of hydroxyalkoxy groups added per glucose ring unit of cellulose.

As the water-soluble cellulose ether, preference is given to hydroxyalkyl alkyl celluloses including hydroxypropyl methyl cellulose and hydroxyethyl methyl cellulose, among the above listed celluloses, from the standpoint of material separation resistance.

Preferably the water-soluble cellulose ether forms a 1 wt % aqueous solution having a viscosity of 30 to 30,000 mPa·s, more preferably 300 to 25,000 mPa·s, and even more preferably 500 to 20,000 mPa·s, as measured at 20° C. by a Brookfield viscometer at 12 rpm. The water-soluble cellulose ether may be commercially available or prepared by any well-known methods.

In the thickener, the water-soluble cellulose ether is preferably present in an amount of 75.0 to 99.0% by weight, more preferably 83.0 to 95.0% by weight from the standpoint of providing the hydraulic composition with a desired viscosity.

In the thickener, a defoamer may be added for the purpose of adjusting an amount of air entrained in the hydraulic composition. Suitable defoamers include oxyalkylene, silicone, alcohol, mineral oil, fatty acid, and fatty acid ester base defoamers.

Examples of the oxyalkylene base defoamer include polyoxyalkylenes such as (poly)oxyethylene-(poly)oxypropylene adducts; (poly)oxyalkylene alkyl ethers such as diethylene glycol heptyl ether, polyoxyethylene oleyl ether, polyoxypropylene butyl ether, polyoxyethylene polyoxypropylene 2-ethylhexyl ether, and oxyethylene oxypropylene adducts to higher alcohols of 8 or more carbon atoms or secondary alcohols of 12 to 14 carbon atoms; (poly)oxyalkylene (alkyl) aryl ethers such as polyoxypropylene phenyl ether and polyoxyethylene nonyl phenyl ether; acetylene ethers obtained from addition polymerization of alkylene oxides to acetylene alcohols such as 2,4,7,9-tetramethyl-5-decyne-4,7-diol, 2,5-dimethyl-3-hexyne-2,5-diol, and 3-methyl-1-butyn-3-ol; (poly)oxyalkylene fatty acid esters such as diethylene glycol oleic acid ester, diethylene glycol lauric acid ester, ethylene glycol distearic acid ester, and polyoxyalkylene oleic acid esters; (poly)oxyalkylene sorbitan fatty acid esters such as polyoxyethylene sorbitan monolauric acid ester and polyoxyethylene sorbitan trioleic acid ester; (poly)oxyalkylene alkyl (aryl) ether sulfuric acid ester salts such as polyoxypropylene methyl ether sodium sulfate and polyoxyethylene dodecyl phenol ether sodium sulfate; (poly)oxyalkylene alkyl phosphoric acid esters such as (poly)oxyethylene stearyl phosphoric acid ester; (poly)oxyalkylene alkyl amines such as polyoxyethylene lauryl amine; and polyoxyalkylene amides. Examples of the silicone base defoamer include dimethylsilicone oil, silicone paste, silicone emulsions, organic modified polysiloxanes (e.g., polyorganosiloxanes such as dimethylpolysiloxane), and fluorosilicone oil. Examples of the alcohol base defoamer include octyl alcohol, 2-ethylhexyl alcohol, hexadecyl alcohol, acetylene alcohol, and glycol. Examples of the mineral oil base defoamer include kerosine and liquid paraffin. Examples of the fatty acid base defoamer include oleic acid, stearic acid, and alkylene oxide adducts thereof. Examples of the fatty acid ester base defoamer include glycerol monolicinolate, alkenyl succinic acid derivatives, sorbitol monolaurate, sorbitol trioleate, and natural wax. Of these, oxyalkylene base defoamers are preferred for defoaming ability.

An appropriate amount of the defoamer added is 0.01 to 20.00%, more preferably 5.00 to 20.00% by weight of the thickener, from the standpoint of the strength of hydraulic composition after placement.

Although the method for preparing the thickener is not particularly limited, it may be prepared by mixing the foregoing components on a suitable mixer such as a ribbon mixer or Nauta® mixer.

Hydraulic Composition

Another embodiment of the invention is a hydraulic composition comprising the thickener defined above, a hydraulic substance, and water. The hydraulic composition may be used as concrete, mortar or cement paste.

A concrete-forming hydraulic composition contains the inventive thickener, a hydraulic substance (cement), water, fine aggregate (sand), and coarse aggregate (gravel). It is used as normal concrete, medium flow concrete, high flow concrete, under water inseparable concrete, and spray concrete.

A mortar-forming hydraulic composition contains the inventive thickener, a hydraulic substance (cement), water, and fine aggregate (sand). It is used as tile bonding mortar, repairing mortar, and self-leveling material.

A cement paste-forming hydraulic composition contains the inventive thickener, a hydraulic substance (cement), and water. It is used as adhesive for tile-like inorganic building members and grout for filling the gap between members.

From the standpoint of material separation resistance, the hydraulic composition contains the thickener in an amount of preferably 0.003 to 0.220% by weight, more preferably 0.004 to 0.065% by weight when the hydraulic composition is for concrete use; in an amount of preferably 0.004 to 0.320% by weight, more preferably 0.006 to 0.094% by weight when the hydraulic composition is for mortar use; and in an amount of preferably 0.010 to 0.890% by weight, more preferably 0.018 to 0.265% by weight when the hydraulic composition is for cement paste use;

Typical of the hydraulic substance are hydraulic cements including normal Portland cement, high-early-strength Portland cement, moderate heat Portland cement, Portland blast-furnace slag cement, silica cement, fly ash cement, alumina cement, and ultra-high-early-strength Portland cement.

From the standpoint of strength, the content of the hydraulic substance (cement) is preferably 270 to 800 kg per cubic meters of concrete when the hydraulic composition is for concrete use; preferably 300 to 1,000 kg/m$^3$ of mortar when the hydraulic composition is for mortar use; and preferably 500 to 1,600 kg/m$^3$ of cement paste when the hydraulic composition is for cement paste use.

Examples of water include tap water and sea water, with tap water being preferred from the standpoint of salt injury.

The hydraulic composition preferably has a water/cement ratio (W/C) of 30 to 75% by weight, more preferably 45 to 65% by weight, from the standpoint of material separation.

If necessary, the hydraulic composition may further contain an aggregate. Fine aggregates and coarse aggregates are included. Suitable fine aggregates include river sand, land sand, pit sand and ground sand, and the (maximum) particle size thereof is preferably up to 5 mm. Suitable coarse aggregates include river gravel, land gravel, pit gravel, and ground gravel, and the (maximum) particle size thereof is greater than that of fine aggregates and preferably up to 40 mm, more preferably up to 25 mm.

The content of the fine aggregate is preferably 400 to 1,100 kg per cubic meters of concrete, more preferably 500 to 1,000 kg/m$^3$, when the hydraulic composition is for concrete use; and preferably 500 to 2,000 kg per cubic meters of mortar, more preferably 600 to 1,600 kg/m$^3$, when the hydraulic composition is for mortar use.

The content of the coarse aggregate is preferably 600 to 1,200 kg per cubic meters of concrete, more preferably 650 to 1,150 kg/m$^3$, when the hydraulic composition is for concrete use.

When the hydraulic composition is for concrete use, a fine aggregate percentage (% by volume) in the aggregate is preferably 30 to 55% by volume, more preferably 35 to 55% by volume, and even more preferably 35 to 50% by volume, from the standpoint of flow or satisfactory strength. Notably, the fine aggregate percentage (% by volume) is calculated as (volume of fine aggregate)/(volume of fine aggregate+volume of coarse aggregate)×100.

To the hydraulic composition, an admixture may be added, if necessary, for the purposes of suppressing heat release upon setting and increasing durability after setting. Suitable admixtures include blast furnace slag and fly ash.

To the hydraulic composition, a water-reducing agent may be added, if necessary, for obtaining good flow retention with a low content of water. Suitable water-reducing agents include lignin, polycarboxylic acid, and melamine base water-reducing agents. Lignin base water-reducing agents include lignin sulfonic acid salts and derivatives thereof. Polycarboxylic acid base water-reducing agents include polycarboxylic acid ethers, polycarboxylic acid ester/cross-linked polymer composites, polycarboxylic acid ether/oriented polymer composites, polycarboxylic acid ether/highly modified polymer composites, polyether carboxylic acid polymers, maleic acid copolymers, maleate copolymers, maleic acid derivative copolymers, carboxyl-containing polyethers, sulfone-terminated polycarboxylic acid-containing multi-component polymers, polycarboxylic acid base graft copolymers, polycarboxylic acid base compounds, and polycarboxylic acid ether base polymers. Melamine base water-reducing agents include melamine sulfonic acid-formaldehyde condensates, melamine sulfonic acid salt condensates, and melamine sulfonic acid salt-polyol condensates.

The amount of the water-reducing agent added is preferably 0.01 to 5% by weight, more preferably 0.1 to 3% by weight based on the hydraulic substance (cement), from the standpoint of flow of the hydraulic composition.

In the hydraulic composition, an air entraining (AE) agent may be added, if necessary, for gaining an appropriate content of air for rendering the composition durable. Suitable AE agents include anionic surfactants, cationic surfactants, nonionic surfactants, amphoteric surfactants, and rosin base surfactants. Exemplary of the anionic surfactant are carboxylic acid, sulfuric acid ester, sulfonic acid, and phosphoric acid ester type surfactants. Exemplary of the cationic surfactant are amine salt, primary amine salt, secondary amine salt, tertiary amine salt, and quaternary amine salt type surfactants. Exemplary of the nonionic surfactant are ester, ester-ether, ether and alkanol amide type surfactants. Exemplary of the amphoteric surfactant are amino acid and sulfo-betaine type surfactants. Exemplary of the rosin base surfactant are abietic acid, neoabietic acid, palustric acid, pimaric acid, isopimaric acid, and dehydroabietic acid.

In the hydraulic composition, a defoamer may be used, if necessary, for providing the composition with strength. Examples of the defoamer are as exemplified above for the defoamer added to the thickener.

If desired, a set accelerator such as calcium chloride, lithium chloride or calcium formate, and a set retarder such as sodium citrate or sodium gluconate may be added to the hydraulic composition, for the purpose of controlling the physical properties of the hydraulic composition immediately after mixing (fresh concrete, fresh mortar or fresh cement paste).

Also, an expanding agent may be added to the hydraulic composition, if necessary, for preventing shrinkage crazing on setting and drying, and for preventing crazing concomitant with thermal stresses by the hydration heat of cement. Suitable expanding agents include hauyne and lime base agents.

The hydraulic composition may be prepared by standard techniques. For example, a twin-shaft compulsion mixer is charged with the thickener, hydraulic substance (cement) and optionally, aggregate (fine and coarse aggregates), and defoamer, which are dry mixed. Thereafter, water is added to the mixture, and further mixing yields a hydraulic composition. The inventive thickener ensures that the hydraulic composition containing the thickener is improved in flow while maintaining rheological properties.

Example

Examples of the invention are given below by way of illustration and not by way of limitation.

Examples 1 to 15 and Comparative Examples 1 to 5

A thickener was prepared by weighing and mixing an anionic polyacrylamide (Table 1), a water-soluble cellulose ether (Table 2) and an optional defoamer in the contents shown in Table 4, each thickener being 100 g. Examples 1 to 15 used two anionic polyacrylamides having different degrees of anionization (Ad), i.e., first anionic polyacrylamide (PAM1) and second anionic polyacrylamide (PAM2) selected from the list of anionic polyacrylamides in Table 1.

Next, a hydraulic composition (cement paste) was prepared according to the formulation shown in Table 3. Specifically, the thickener and previously uniformly mixed normal Portland cement were fed into a mortar mixer according to JIS R5201:2015, where they were dry mixed for 1 minutes. Thereafter tap water was added to the mix, which was agitated at a rotation speed of 140±5 rpm and a revolution speed of 62 rpm for 3 minutes, yielding a hydraulic composition (cement paste).

Ingredients
(1) Anionic polyacrylamide (PAM): Himoloc® (Hymo Corp.), specifications in Table 1
(2) water-soluble cellulose ether (CE), specifications in Table 2
(3) Defoamer: oxyalkylene base defoamer, SN-Defoamer 14HP (San Nopco Ltd.)
(4) Hydraulic substance: normal Portland cement (Taiheiyo Cement Co., Ltd.)
(5) Water: tap water

TABLE 1

| Sample No. | Trade name | Degree of anionization Ad (mol %) | Pendant chemical structure of anionic polyacrylamide |
|---|---|---|---|
| PA1 | Himoloc SS-500 | 5 | $CONH_2$, $COO^-$ $Na^+$ |
| PA2 | Himoloc SS-130 | 30 | $CONH_2$, $COO^-$ $Na^+$ |
| PA3 | Himoloc SS-120 | 20 | $CONH_2$, $COO^-$ $Na^+$ |
| PA4 | Himoloc AP-105 | 5 | $CONH_2$, $COO^-$ $Na^+$, $CONHCH_2SO_3^-$ $Na^+$ |
| PA5 | Himoloc AP-115 | 15 | $CONH_2$, $COO^-$ $Na^+$, $CONHCH_2SO_3^-$ $Na^+$ |

It is noted that the viscosity of cellulose is a viscosity of a 1 wt % aqueous solution as measured at 20° C. by a Brookfield viscometer at 12 rpm.

TABLE 2

| Sample No. | Type | Viscosity (mPa · s) | DS of methoxy | MS of hydroxy-propoxy | MS of hydroxy-ethoxy |
|---|---|---|---|---|---|
| CE1 | HPMC | 2,130 | 1.83 | 0.18 | — |
| CE2 | HPMC | 540 | 1.78 | 0.16 | — |
| CE3 | HPMC | 5,040 | 1.78 | 0.16 | — |
| CE4 | HPMC | 2,300 | 1.45 | 0.20 | — |
| CE5 | HEMC | 2,150 | 1.50 | — | 0.33 |
| CE6 | HPMC | 18,000 | 1.51 | 0.21 | — |

HPMC: hydroxypropyl methyl cellulose
HEMC: hydroxyethyl methyl cellulose

TABLE 3

| Hydraulic composition No. | Thickener (g) | Normal Portland cement (g) | Water (g) | W/C ratio (wt %) |
|---|---|---|---|---|
| #1 | 0.36 (0.069 wt %) | 360 | 162 | 45 |
| #2 | 0.31 (0.059 wt %) | 360 | 162 | 45 |

The value in parenthesis in the column of thickener is a content (wt %) of thickener in hydraulic composition.

The hydraulic composition (cement paste) was measured for paste flow and tack strength by the following methods.

Paste Flow

A paste flow was measured by conditioning a cement paste sample at 20±3° C. and testing according to JASS 15M-103.

Tack Strength

To a stainless steel cylindrical container of diameter 45 mm and height 60 mm, 80 g of a hydraulic composition (cement paste) conditioned at 20±3° C. was fed. Test conditions included a texture analyzer TA-XT plus (EKO Instruments), a cylindrical sensor (polypropylene resin probe) having a diameter of 25 mm, a penetration distance of 25 mm, and a penetrating/pulling up speed of 5 mm/sec. A bonding force upon pulling up was measured and reported as tack strength.

The results are shown in Table 4.

ization in combination, a hydraulic composition is improved in flow while maintaining rheological properties.

Japanese Patent Application No. 2017-209948 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A thickener for hydraulic compositions consisting essentially of:
   1 to 25% by weight of an anionic polyacrylamide group containing at least two anionic polyacrylamides having different degrees of anionization;
   75 to 99% by weight of at least one hydroxyalkyl alkyl cellulose; and
   0 to 20% by weight of a defoamer,

TABLE 4

| | | Thickener | | | | | | | | | Hydraulic composition | | |
| | | Anionic polyacrylamide group | | | | | Water-soluble cellulose ether | | Defoamer | | | |
| | | PAM1 (A) | PAM2 (B) | Weight ratio (A:B) | Ad (mol %) Difference* | Weighted average | Content (wt %) | Sample No. (Table 2) | Content (wt %) | Content (wt %) | Formulation No. (Table 3) | Paste flow (mm) | Tack strength (g · sec) |
|---|---|---|---|---|---|---|---|---|---|---|---|---|---|
| Example | 1 | PA1 | PA2 | 40:60 | 25 | 20.00 | 2.9 | CE1 | 97.1 | 0.0 | 2 | 131 | 11.5 |
| | 2 | PA1 | PA2 | 25:75 | 25 | 23.75 | 2.5 | CE1 | 83.3 | 14.2 | 1 | 127 | 12.9 |
| | 3 | PA1 | PA2 | 40:60 | 25 | 20.00 | 2.5 | CE1 | 83.3 | 14.2 | 1 | 130 | 11.2 |
| | 4 | PA1 | PA2 | 75:25 | 25 | 11.25 | 2.5 | CE1 | 83.3 | 14.2 | 1 | 129 | 12.1 |
| | 5 | PA1 | PA2 | 40:60 | 25 | 20.00 | 2.5 | CE2 | 83.3 | 14.2 | 1 | 137 | 6.2 |
| | 6 | PA1 | PA2 | 40:60 | 25 | 20.00 | 2.5 | CE3 | 83.3 | 14.2 | 1 | 120 | 22.0 |
| | 7 | PA1 | PA2 | 40:60 | 25 | 20.00 | 2.5 | CE6 | 83.3 | 14.2 | 1 | 118 | 25.0 |
| | 8 | PA1 | PA2 | 40:60 | 25 | 20.00 | 2.5 | CE4 | 83.3 | 14.2 | 1 | 131 | 10.5 |
| | 9 | PA1 | PA2 | 40:60 | 25 | 20.00 | 2.5 | CE5 | 83.3 | 14.2 | 1 | 131 | 10.2 |
| | 10 | PA4 | PA5 | 75:25 | 10 | 7.50 | 2.5 | CE1 | 83.3 | 14.2 | 1 | 130 | 10.0 |
| | 11 | PA4 | PA5 | 50:50 | 10 | 10.00 | 2.5 | CE1 | 83.3 | 14.2 | 1 | 125 | 13.2 |
| | 12 | PA4 | PA5 | 37.5:62.5 | 10 | 11.25 | 2.5 | CE1 | 83.3 | 14.2 | 1 | 127 | 11.8 |
| | 13 | PA4 | PA5 | 25:75 | 10 | 12.50 | 2.5 | CE1 | 83.3 | 14.2 | 1 | 127 | 11.8 |
| | 14 | PA1 | PA5 | 50:50 | 10 | 10.00 | 2.5 | CE1 | 83.3 | 14.2 | 1 | 128 | 12.4 |
| | 15 | PA4 | PA2 | 40:60 | 25 | 20.00 | 2.5 | CE1 | 83.3 | 14.2 | 1 | 127 | 12.0 |
| Comparative Example | 1 | PA3 | — | 100:0 | — | 20.00 | 2.9 | CE1 | 97.1 | 0.0 | 2 | 120 | 12.6 |
| | 2 | PA3 | — | 100:0 | — | 20.00 | 2.5 | CE1 | 83.3 | 14.2 | 1 | 122 | 13.7 |
| | 3 | PA3 | — | 100:0 | — | 20.00 | 2.5 | CE2 | 83.3 | 14.2 | 1 | 127 | 7.5 |
| | 4 | PA3 | — | 100:0 | — | 20.00 | 2.5 | CE3 | 83.3 | 14.2 | 1 | 111 | 23.5 |
| | 5 | PA3 | — | 100:0 | — | 20.00 | 2.5 | CE6 | 83.3 | 14.2 | 1 | 107 | 26.5 |

*Difference ($Ad_{PAM2} - Ad_{PAM1}$) in degree of anionization between two anionic polyacrylamides As seen from the results of Examples 1 to 4 and Comparative Examples 1 to 2, when a thickener containing two anionic polyacrylamides having different degrees of anionization is used, a hydraulic composition marks a paste flow increase of 5 mm or more while the tack strength is maintained above a certain level. This improving effect is observed even when the weight ratio (A:B) of first to second anionic polyacrylamide is changed.

As seen from the results of Examples 5 to 9 and Comparative Examples 3 to 5, the same improving effect is observed even when various cellulose ethers are used.

As seen from the results of Examples 10 to 15, the same improving effect is observed when sulfomethyl-modified polyacrylamides are used in the anionic polyacrylamide group, and when a non-sulfomethyl-modified polyacrylamide and a sulfomethyl-modified polyacrylamide are used in combination.

It is demonstrated that using a thickener containing two anionic polyacrylamides having different degrees of anionwherein the thickener does not include hydroxyalkyl celluloses.

2. The thickener of claim 1 wherein in the anionic polyacrylamide group containing at least two anionic polyacrylamides having different degrees of anionization, a difference in degree of anionization between anionic polyacrylamides is at least 3 mol %.

3. The thickener of claim 1 wherein in the anionic polyacrylamide group containing at least two anionic polyacrylamides having different degrees of anionization, a weighted average value of the degrees of anionization is from more than 2.0 mol % to 33.2 mol %.

4. The thickener of claim 1 wherein the anionic polyacrylamide group has an alkali metal or alkaline earth metal cation as the counter cation.

5. The thickener of claim 1 wherein the anionic polyacrylamide group consists of a first anionic polyacrylamide having a degree of anionization of 1 mol % to 6 mol % and a second anionic polyacrylamide having a degree of anionization of more than 6 mol % to 40 mol %.

6. The thickener of claim 1 wherein the at least one hydroxyalkyl alkyl cellulose has a 1 wt % aqueous solution viscosity of 30 to 30,000 mPa·s at 20° C.

7. The thickener of claim 1 wherein the at least one hydroxyalkyl alkyl cellulose is at least one cellulose selected from the group consisting of hydroxypropyl methyl cellulose and hydroxyethyl methyl cellulose.

8. A hydraulic composition comprising the thickener of claim 1, a hydraulic substance, and water.

9. The thickener of claim 1 wherein the at least one hydroxyalkyl alkyl cellulose is hydroxypropyl methyl cellulose or hydroxyethyl methyl cellulose.

10. The thickener of claim 1 wherein the defoamer is any one selected from the group consisting of oxyalkylene, silicone, alcohol, mineral oil, fatty acid, and fatty acid ester base defoamers.

11. The thickener of claim 1 wherein the defoamer is any one selected from the group consisting of oxyalkylene base defoamers.

12. The thickener of claim 1 wherein the anionic polyacrylamide group is present in an amount of 1 to 10% by weight.

13. The thickener of claim 1 wherein the defoamer is present in an amount of 5 to 20% by weight.

14. The hydraulic composition of claim 8 wherein the thickener is present in an amount of 0.004 to 0.065% by weight when the hydraulic composition is for concrete use.

15. The hydraulic composition of claim 8 wherein the thickener is present in an amount of 0.006 to 0.094% by weight when the hydraulic composition is for mortar use.

16. The hydraulic composition of claim 8 wherein the thickener is present in an amount of 0.018 to 0.265% by weight when the hydraulic composition is for cement paste use.

17. The thickener of claim 1 wherein the anionic polyacrylamide group consists of two anionic polyacrylamides having different degrees of anionization, a difference in degree of anionization between anionic polyacrylamides is at least 3 mol %.

18. The thickener of claim 1 wherein the at least one hydroxyalkyl alkyl cellulose has a 1 wt % aqueous solution viscosity of 500 to 20,000 mPa·s at 20° C.

* * * * *